United States Patent [19]

Garcia et al.

[11] Patent Number: 4,654,066
[45] Date of Patent: Mar. 31, 1987

[54] ELECTRONIC SYSTEM TO CONTROL COOLING OF MOLDS IN GLASSWARE FORMING MACHINES

[75] Inventors: Victor G. Garcia; Ricardo J. P. Serrano; Fernando V. Elizalde; Luis F. Cardenas, all of Monterrey, Mexico

[73] Assignee: Vitro Tec Fideicomiso, Monterrey, Mexico

[21] Appl. No.: 769,580

[22] Filed: Aug. 26, 1985

Related U.S. Application Data

[63] Continuation of Ser. No. 543,110, Oct. 18, 1983, abandoned.

[51] Int. Cl.$^4$ ............................................. C03B 9/40
[52] U.S. Cl. ........................................ 65/29; 65/162; 65/355; 65/DIG. 13
[58] Field of Search ............... 65/29, 82, 162, 355, 65/DIG. 13

[56] References Cited

U.S. PATENT DOCUMENTS

| | | | |
|---|---|---|---|
| 3,416,908 | 12/1968 | Goodwin et al. | 65/162 |
| 3,988,139 | 10/1976 | Goodwin | 65/162 |
| 4,368,062 | 1/1983 | Mapes et al. | 65/29 |
| 4,457,772 | 7/1984 | Haynes et al. | 65/160 |

Primary Examiner—Arthur Kellogg
Attorney, Agent, or Firm—Abelman Frayne Rezac & Schwab

[57] ABSTRACT

An electronic system to control the cooling of molds in glassware forming machines, wherein the articles and/or the molds in which said articles are being produced, are subjected to a suitable cooling to control the thermal relation therebetween so that the articles can be suitable handled and shaped. In this system, the velocity of the machine, the heat profile of the glass gobs and the gob weight are continuously detected and fed as signals to a microprocessor which determines the heat exitation of the molds when receiving the glass gobs, in order to control the necessary cooling air flow rate and compensate for variations in the thermal conditions of the molds. Said microprocessor is also fed, at predetermined intervals of time, with signals representative of the pressure, temperature and humidity of the cooling air, in order to determine the physical properties of the cooling air and relate them with the operation conditions of the machine for compensating for changes in the physical conditions of the ambient, and for forecasting the changes in the ambient conditions for correcting, if necessary, the parameters initially gave to said microprocessor up-dating and self-correcting those initial values and for maintaining the operation of the cooling system even when said pressure, temperature and humidity signals are lost.

1 Claim, 2 Drawing Figures

ELECTRONIC SYSTEM TO CONTROL COOLING OF MOLDS IN GLASSWARE FORMING MACHINES

This application is a continuation of application Ser. No. 543,110 filed on Oct. 18, 1983, now abandoned.

BACKGROUND OF THE INVENTION

In shaping glass articles, molten glass gobs are fed to the individual shaping sections of the machines. The gobs are received in molds in which, either a parison is first formed by the press-and-blow or blow-and-blow process and then the final article is shaped by blowing, or else, the article is shaped directly in the molds.

The molds continuously receive gobs of molten glass and gradually increase in temperature. It is known that between the molds and the articles that are being shaped there is a heat compromise in that the molds must be kept at a temperature making it possible to maintain a heat balance between the glass and the mold. The molds must not be so hot that it additionally heats the glass to such a degree that the required stiffness for handle the articles cannot be achieved. On the other hand, the mold must not be so cold that it cools the glass and solidifies it more than necessary, impeding the suitable shaping of the article.

Heat control of the process of shaping glass and particularly glass bottles is very complex due to the number of variables including cycle time, mold temperature, weight of the articles and air temperature, which must be within certain limits to maintain good and uniform quality of the final product. Many decades of experience in the shaping process have established limits for each of the many variables. Each different article requires a different set of operating parameters which are based on prior experience in producing the articles and if an entirely new article is involved, operating parameters are established from prior experience with a similar article. This, together with high production demands, fluctuations in the cooling fluid temperature and the various designes of the shaping machines, cause the requirements for extraction of heat from the molds to vary widely. The molds are cooled, for the most part, by forced air which even though air has a low heat capacity and is not an ideal medium for heat transfer, it is however, more economical and easy to use in comparison with other cooling systems.

It is common practice in multisection machines to provide a single cooling air supply which is divided among the various sections of the machine and control of the total flow compensates for variations that occur in practice. It is important to compensate for these variations, since if they are not taken into consideration, the amount of cooling experienced by each particular mold changes, which leads to insufficient or excessive cooling and improperly formed glass articles that have to be thrown away. Two main sources of variation in the mold cooling system will be considered here.

A source over which it is not possible to exert effective control is the ambient air surrounding the machine because both the air temperature and its humidity change daily and seasonally. The other source comprises the condition of the cooling system such as the temperature and pressure of the cooling air supply, the properties of the cooling fluid such as humidity, viscosity, specific heat, conductivity, density, etc., and almost all the operating parameters of the machine, including type of glass handled, glass temperature, weight of glass gobs from which the articles are produced, temperature of the molds, operating time (cuts per minute), type of machine, etc.

Another important change in the cooling conditions under which the machine operates occurs from disturbances in the cooling air supply to the machine and/or when operating all or less than all the individual sections in a multisection machine.

Controlled cooling of molds in machines which produce glass articles, was originally done manually and was totally dependent on the judgment and experience of the operator. There was no analysis of causes and effects, and the results were far from optimal. Manual control resulted in a relatively high loss of articles and correspondingly a considerable reduction of production, because only when the operator realized that the articles did not have suitable characteristics, did he make adjustments which in his experience he considered suitable. There would be a preliminary loss of articles and after manual adjustments had been made and a period passed for the system to reach its heat balance, there would be a secondary loss of articles. Finally, when a more or less suitable heat balance was obtained, other disturbances occurred for different causes, such as variation of the furnace temperature that caused the glass to be too cool or too hot, a slight variation in the weight of the gob, and in general, internal and/or external heat changes (climatological changes) that required new adjustments. Thus, there was a third loss of articles until a state of equilibrium was attained. Continuous monitoring of the cooling by the operator with a considerable sacrifice in production were required which increased the manufacturing costs of the glass articles.

U.S. Pat. No. 3,860,407 of Fertik, issued on Jan. 14, 1975, describes a system for controlling the cooling of the molds in a glass forming machine which involves compensating the pressure set point for the control of the cooling air to correct for changes in the temperature of the cooling air and changes in the mass flow rate of the glass. In said system, the actual pressure and temperature of the cooling air are continuously compared with predetermined pressure and temperature set points for an established cooling process in order to compensate for variations from said predetermined set points.

The main problem with said system is that it is blind about the actual thermal exitation of the molds. In said system the pressure and temperature of the cooling air in the duct are continuously monitored but it does not take into account the actual physical conditions of the cooling air (depending of the physical conditions of the environment) which are of substantial influence in the thermal excitation of the molds. On the other hand, said system discloses that block 76 is a function of the speed of the machine and that the position of tab 86 a is proportional to weight of the glass gobs, but these data serve only to be compared with those of the predetermined set points in order to compensate for deviations from said set points. Concluding, the main problem of said system arises when the conditions of the cooling process could be at the desired set points, but the actual needs of said cooling process could be entirely different from said conditions established by the set points.

U.S. Pat. No. 3,953,188 of Fertik also, issued on Apr. 27, 1976, include some improvements over the above cited patent in that during conditions of maximum and minimum flow of the cooling air, the balance of heat transfer between the air and the parisons in modified by modifying the set points of the temperature controllers of the feeder or alternatively by changing the speed of the machine.

As in the previous mentioned system, in the above system the cooling process depends on the comparation of the actual conditions of pressure and temperature of the cooling air with those provided as set points, but including security means for saturation conditions.

U.S. Pat. No. 4,104,046 of McCreery, issued on Aug. 1, 1978, describes a system of automatic temperature control applied to a machine for continuous shaping of glass articles of the press-and-blow type. The conditions of heat transfer in the parison shaping units are automatically detected and the supply of cooling air, to these units is automatically controlled, to maintain uniform quality in the final shaped articles. In said system, the fluid passages are provided to make the cooling air circulate to the parison mold and the piston of each shaping unit and this air supply is controlled automatically in keeping with the heat transfer of these members. The control is automated by temperature detection instruments, such as infrared cameras placed in selected positions in the path of travel of the parison mold and piston of each of the shaping units of the machines. The cameras produce a signal from each member, which operates a control that, in turn, operates a pressure load regulator, such as an electropneumatic transducer in the cooling air supply line for that particular member. In this way, controlled temperature conditions are maintained to produce uniform articles, by avoiding excessive heating or cooling of the parison molds.

In said system the pressure of the cooling air is regulated depending on the temperature of the molds, but it does not take directly into account the actual exitation of the molds which depends also on the weight of the glass gobs and the velocity of the machine which determines the number of glass gobs processed by the molds. Furthermore it does not take directly into account the physical properties of the cooling air which are of substantial influence in the thermal excitation of the molds.

Further problems arise in said system because of the gases of oil and grease and the oxides appearing in the molds, all of which affect the measurements of the temperature of the mold cavities by the cameras.

U.K. Patent application GB No. 2011128 A, filed Dec. 1, 1978 and published July 4, 1979, describes a cooling control system to control the cooling of various parts of an independent section of a machine for shaping glass articles. The cooling air which goes through a cooling duct is controlled by measuring the cooling capacity of the air determined by placing a body whose material and surface characteristics approximate those of the molds in the air flow and measuring its surface temperature and simultaneously measuring the pressure of the cooling air supply. The flow of the air through the duct is increased or reduced to keep the pressure in the duct at a set point which depends on the temperature measured on the surface of the body located in the cooling air current.

That system also presents the same problem of the temperature set point established by the mold simmulator body.

As can be seen from the above disclosure, practically all of said systems are based on a constant thermal excitation applyed to certain fixed temperature conditions.

With this background, the present invention, trough an analysis of the requirements of the process for making bottles, defines the needs of:

1. Determining the actual thermal excitation of the molds in order to, through a predetermined model, if a variation on the thermal condition of entrance to the mold appear, the cooling system could compensate the cooling needs for said variations.

Applying the time series methodology on valuating the thermal excitation produced by the glass gobs to the molds, the time of response of the molds was determined. On this basis, if an indication of the velocity of the machine (through a gob cutting sensor) is obtained and if the thermal profile of the glass gobs (measured through a gob sensor placed at the output of the delivery equipment and at consecutive sampling) as well as the weight of the glass gobs (by weighing the finished articles or by some other signal available from the machine) are known, it is possible to accurate know the thermal excitation of the molds by adaptative control mathematic models.

2. Making the process of cooling the molds independent of the ambient variations by monitoring, at predetermined intervals of time, said ambient variations and conditions of the manufacturing process, for determining the physical properties of the cooling air and its cooling capacity for said manufacturing process conditions in order to compensate for said ambient variations.

To achieve the above it is first necessary to define a heat model in which the variation both of the ambient medium and the manufacturing process conditions would be related so that an automatic control could be performed that would have the enormous advantage of being sufficiently versatile, that the cooling process would be independent of the ambient conditions and manufacturing process.

As it is well known in tha art, theoretical research associated with the heat transfer mechanism by forced convection in cooling of molds in very complicated and so far it has not been possible to calculate a heat transfer coefficient by analytic methods.

However, the inventors here discovered that by applying the technique of dimensional analysis, the variables involved in the process of heat transfer by forced convection can be grounded in nondimensional terms to be able to find the heat transfer coefficient as a function of these terms, and by making a stable state energy balance, a heat model is obtained as a function of variables that are easy to measure and interpret.

In this way, with the method of dimensional analysis it was possible to establish an equation for the coefficient of heat transfer by forced convection, as a function of the variables involved in the process, and from the stable state energy balance, it was concluded that the molds and their parts acquire a temporary heat energy storage and that during the entire operation cycle they act solely as a transfer mechanism.

Thus, with te equation of the heat transfer coefficient and the energy balance equation, a heat model was reached whereby through a simple measuring system, operational parameters of the mold cooling system could be established.

The representative equation of the heat model discovered by the inventors of this invention is the following:

$$n \log P = (\log \beta^* - jm) - (1 + j\alpha) \log (ts - Ta)$$

where:

$\beta^*$—is a factor that is a function of the conditions of operation and geometry of the machines (type of glass, amber, georgia green, etc., glass temperature, weight of article, type of mold, cycle time, geometry of nozzles, type of machine, blow pressure, no. of sections, lubricating, physical state of mold, etc.);

m—is a factor that is a function of the physical conditions of the cooling fluid (viscosity, density, temperature, humidity, etc.);

n—is a factor that relates the air velocity with the static pressure (turbulence, nozzle losses, leaks, etc.);

j—is a factor that is a function of the distribution of speed of the cooling fluid over the mold;

p—is the static pressure of the cooling fluid;

ts—is the temperature of the mold wall;

Ta—is the temperature of the ambient air.

This equation describes the process of cooling of molds by forced convection and expresses what the best way will be to achieve an efficient cooling of the molds since it involves in the first place the properties of air as the cooling fluid in its coefficients m and $\alpha$.

To obtain coefficients $\alpha$ and m, it is known that the cooling capacity of the cooling fluid (air) depends on its density $\rho$ and its viscosity $\mu$, but, these are a function of the temperature and relative humidity of the air, at a particular atmospheric pressure. We can therefore, graph on a logarithmic scale $\rho/\mu$ against a temperature representative of the mold surface (ts-Ta), which provides us a series of points that fit a straight line whose slope represents value $\alpha$ and the intersection of the line with the axis of the ordinates (axis $\rho/\mu$) represents value m.

From a dimensional analysis, it is known that:

$$Nu = (A(Cp\mu)^i/K)(\rho DV)j/\mu) = APr^i Re^j = C_1 Re^j$$

Where Nu is the Nusselt number, Pr is the Prandtl number and Re the Reynolds number. If constant A and the Prandt approximate a constant $C_1$ due to normal atmospheric conditions, the range of variations is negligible.

Therefore, in this equation, factor j depends on the geometry of the mold, nozzles, distance between them, etc.

To quantify j we measure the air flow and its static pressure and find the value of n by an equation:

$$Q = C \times p^n$$

Where Q is air flow, C is a constant that depends on the geometry of the ducts, pressure drops, etc., P is the static air pressure in the duct and n is a factor that relates the air velocity to its static pressure. Therefore, if we graph static pressure P against Ta−(ts-Ta), a straight line is obtained whose slope defines the value of (1+J)/n and hence J is quantified and the intersection of said line with axis ts-Ta, gives a value that corresponds to $(\log-\beta^* - Jm)/(1+\alpha j)$ and, since $\alpha$, j and m are known, it is possible to know $\beta^*$ which is the factor that is a function of the operating conditions and geometry of the machine.

It is further concluded that high value of $\beta^*$ imply mainly high production rates, heavy articles or high glass temperature or a combination of them; these high values of $\beta^*$ require a better design of the nozzles (parameter j), less air leaks or losses by friction (parameter n), etc.

Then parameter $\beta^*$ will be a function of the manufacturing "history" mainly of the article and parameter j/n will refer to the design of the machine from the cooling viewpoint.

Tests run at the K-2 plant in Monterrey, N.L., MEXICO (I-S machines, 2 sections, acticles 50 grams, 23 cuts per minute) proved the viability of this heat model.

Thus, this invention teaches how to achieve a heat model which relates the conditions of the cooling fluid with the data of operation, modes of operation, production and type of shaping machine. Such a heat model makes it possible to provide a cooling system which is absolutely flexible and automatic so that cooling of the actual mold is made independent of variations of the ambient medium. On the basis of the heat model and keeping in mind the need of an automatic control, it is possible to provide an electronic system for controlling cooling of molds. Accordingly by detecting the physical conditions of the cooling fluid such as temperature and humidity and its static pressure, at predetermined intervals of time, it becomes possible—by a program that contains an equation as discussed above contained in the computer memory and through other suitable means—to achieve an effective control necessary in cooling of the articles and/or molds, whereby the quality of the articles produced and/or production of the shaping machines are improved.

Although the system of this invention for cooling molds includes the heat model described above, it is possible to include other types of heat models.

3. Having a forecasting model for predicting the changes in the physical conditions of the ambient air and the pressure of the cooling air in the duct needed for said predicted conditions, by measuring said actual temperature, humidity and pressure at predetermined intervals of time, for example each 2 hr. (at difference with Fertik's system which needs the continuous monitoring thereof), for establishing the ambient behavior history on which said forecasting is based and for correcting, if necessary, said parameters of the forecasting model which will be up-dated self-correcting the initial values gave to said model.

With this characteristic, the cooling system is independent of the temperature, humidity and pressure detections because if one or more of the sensors fail, the system will be working permitting the personal to change the defective sensors.

For said forecasting model, data measurements obtained in-line on a glass forming machine under a plant environment and consisting of cooling air pressure Pat, ambient air temperature Tat, and the external mold surface temperature $T_{bt}$, were analyzed using discrete time series based on the Box Jenkins method. From the analysis, a dynamic model is given for predicting the values of the mold surface temperature $T_{bt}$. The accuracy of the forecast model is corraborated with actual data. A control equation is derived for making the necessary adjustments of $P_{at}$, and compensations for variations in $T_{at}$, to ensure the regulation or minimum deviations, of the output $T_{bt}$, from the target set point.

The analyzed data were taken at discrete time intervals of 2 minutes under normal operation conditions. The total sampling time being 9 hours and the production container 12 OZ. at an I.S. double cavity machine (57 bpm) located at our plant, VIQUESA, in Querétaro, México.

Since $T_{at}$ is an observable variable and not being able to be manipulated, perturbations were induced in $P_{at}$ in order to know the dynamic response of the system ($T_{bt}$).

A preliminary analysis of the raw data showed that $T_{bt}$ could be well represented by an ARMA (p, q) model whose spectral density function had two well defined spikes at values of about 6 minutes and 2 hours. The first one being due to the proper opening-closing function and the second, not clearly identified, is believed to come probably from batch charging operation, inherent viscosity variations, gob weight variations or some action taken in the heating/cooling system during the stages of melting, refining or conditioning.

In order to get rid of the complex arma structure, the data was smoothed by taking averages (each 3 observations) and the generated new data was used to build the dynamic model.

Using the smoothed data the identification and estimation stages were made and conducted to several possible models. Among them three were selected for further study since their residual sum of squares, noise autocorrelation and transfer function weights showed that the data were well represented by them.

Two of the models have the general form:

$$T_{bt} = F_2(B)P_{at} + F_1(B)T_{at} + N_t \quad (1)$$

Where:
$T_{bt}$ = is the deviation of $T_{bt}$ from its mean
$F_2(B)$ is a ratio of polynomials in the back order operator B and represents the transfer function due to $P_{at}$
$F_1(B)$ is the transfer fuction due to $T_{at}$ and
$N_t$ is the noise given by an ARMA (p, q) model.

The third model have the same basic structure as (1) but the variables are expressed as deviations of their values at time t from those at time t-1, and the noise model having a MA (q) structure, however in factorizing this noise model in order to have deviations in $N_t$, the deviations will be cancelled and arrive to equation (1). The basic difference among them is in the values of the transfer fuction and noise model parameters, which were estimated at the 95% confidence limits. The control equation has already been implemented in a microprocessor and its adequancy is being checked in-line, and is relatively easy to implement in a microprocessor due to the linear structure of the model.

4. And the need to achieve a control capable of totally automatic but with a manual operation capability, higly flexible in its operation and with a high reliability index. It is easy to operate, with low maintenance, with monitoring of the process information, economy in the process and the other parameters inherent in these requirements.

BRIEF SUMMARY OF THE INVENTION

Therefore, the principal object of this invention is to provide an electronic control system for cooling molds in glassware forming machines, by which through monitoring continuously the velocity of the machine, the heat profile of the glass gob and the gob weight, it is possible to determine the actual thermal excitation of the molds in order that, if a variation of the thermal conditions of entrance to the molds appear, the cooling system could compensate the cooling needs for said variations.

Another principal object of this invention is to provide an electronic control system for cooling molds in glassware forming machines, by which through monitoring, at predetermined intervals of time, temperature and humidity of the cooling air and its static pressure in the duct and relating them with the manufacturing process conditions it is possible to determine the physical properties of the cooling air and its cooling capacity for said manufacturing process conditions in order to compensate for said ambient variations making the system independent of variations of the ambient and to improve the quality of the product and/or production rate.

A further object of this invention is to provide an electronic control system for cooling molds in glassware forming machines having a forecasting model for predicting through said measurements of temperature and humidity of the cooling air and its pressure in the duct, at predetermined intervals of time, the changes in the ambient conditions and the pressure of the cooling air in the duct needed for said predicted conditions in order to establishing the ambient behavior history on which said forecasting is based and correcting, if necessary the parameters of the forecasting model wich will be up-dated self-correcting the initial values gave to said model.

Another further object of the invention is to provide an electronic system for cooling molds which is totally automatic and flexible yet provides manual operation capability combined with high reliability index, easy of operation, low maintenance, monitoring of process information and economy of operation.

These and other objects and advantages of the invention will be evident to those skilled in this art form the following detailed description of the invention, when read in connection with the attached drawing.

DETAILED DESCRIPTION

Figure 1:
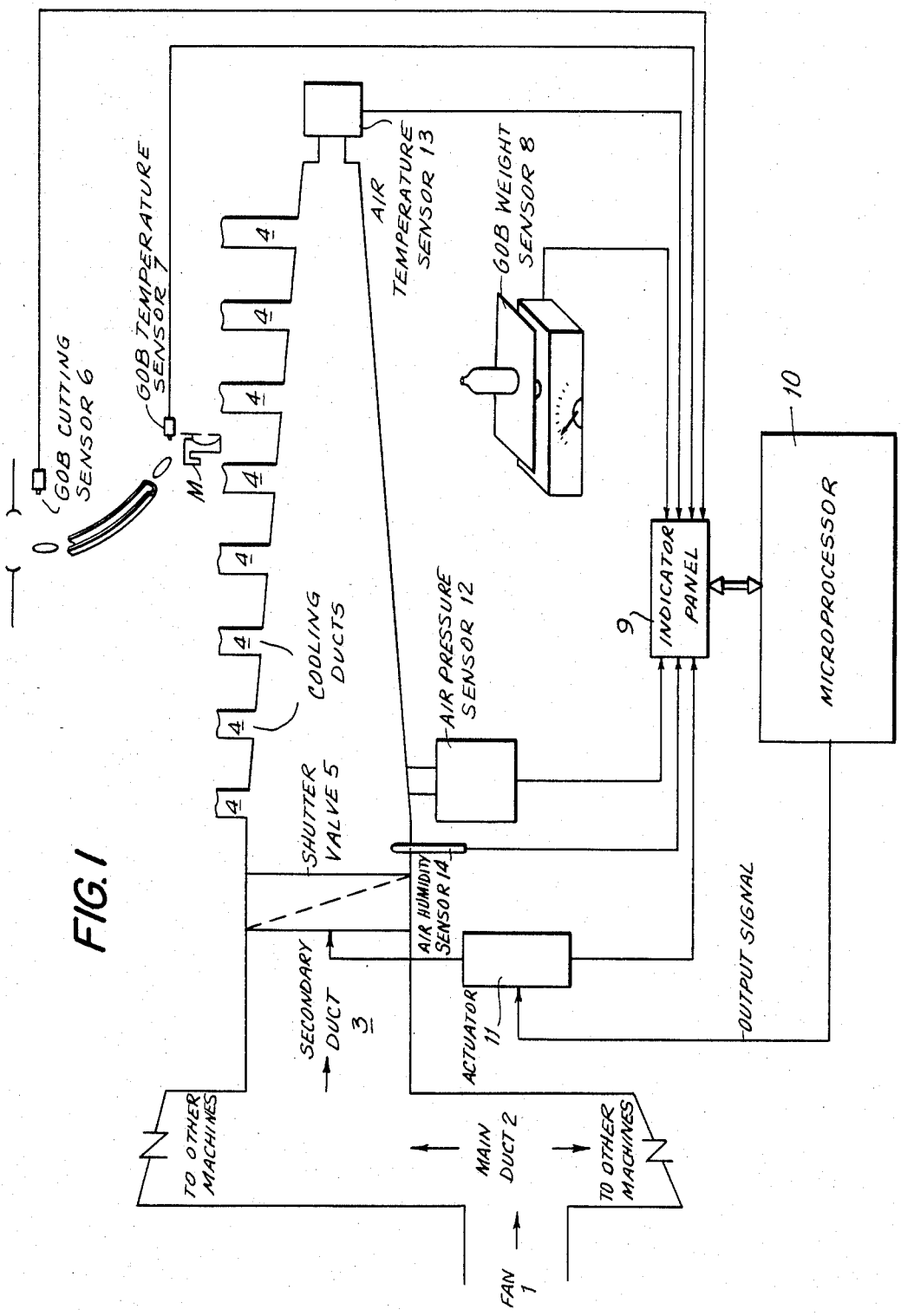
FIG. 1 is a schematic diagram of the system of this invention for cooling of molds useful in the making of glass articles.

With reference to the drawings, cooling of the molds M in machines for producing articles of glass or other materials, such as the I-S machines which normally include eight sections, is achieved by feeding cooling air from the ambient medium by a fan 1 to a main duct 2 which connects with a secondary duct 3, for supplying cooling air to cooling ducts 4 which lead to the different sections of the machine.

Duct 3 is preferrably designed so that it is possible to absorb pressure drops in the supply to the different sections of the machines irrespective of the number of sections being operated at any given time.

Shutter valve 6 located in the duct 3, upstream of cooling ducts 4, regulates the mass flow of cooling air to the different sections of the machines through ducts 4.

The electronic control system for cooling of molds, according to this invention includes:

A gob cutting sensor 6 of any suitable type, which continuously detects and supplies a signal representative of the velocity of the machine, a gob temperature sensor 7, such as a fotodetector which continuously detect the temperature of the glass gob when said gob is passing into the mold and supplies a signal representative of the heat profile of the glass gobs, and a gob weight sensor 8 which could be integrated to the machine or a bascule weighing the finished articles, which continuously detect and supplies a signal representative of the gob weight. The signals of the three sensors 6, 7 and 8 are fed through an indicator panel 9 to a microprocessor 10 having in its memory program an equation which relates said signals to determining the thermal excitation of the molds in order that, if a variation on the thermal condition of entrance to the mold appear, said microprocessor 10 will compensate the cooling needs for said variations by moving the shutter valve 3 through an actuator 11 or alternatively by controlling the speed of the fan 1 through said actuator 11.

A pressure sensor 12, of any suitable type, a temperature sensor 13 such as a thermocouple and a humidity sensor 14, provide electrical analog signals representative of the pressure, temperature and humidity of the cooling air in duct 3 to said microprocessor 10 each 2 hours or another predetermined interval of time. Said microprocessor 10 includes in its memory program an equation which, through said detected pressure, temperature and humidity of the cooling air, calculates the physical condition of said cooling air and relates them with the data of the manufacturing process which includes the models of operation, production and type of the forming machine, glass temperature, types of glass, production rate (cuts per minute), etc., fed to said microprocessor 10 directly by the keyboard of said indicator panel 9 or by any suitable element such as cards, discs, tapes, etc., in order to compensate for variations in the ambient conditions and cooling capacity of said cooling air.

Microprocessor 10 also includes a forecasting program which, based on the history of the ambient behavior provided by sensors 12, 13 and 14, will correct, if necessary, the parameters of the forecasting program up-dating and self-correcting the initial values gave to the same and will perit the cooling system to operate accurately even when said detectors 12, 13 and 14 fail, making the system practically independent from the sensors.

Figure 2:
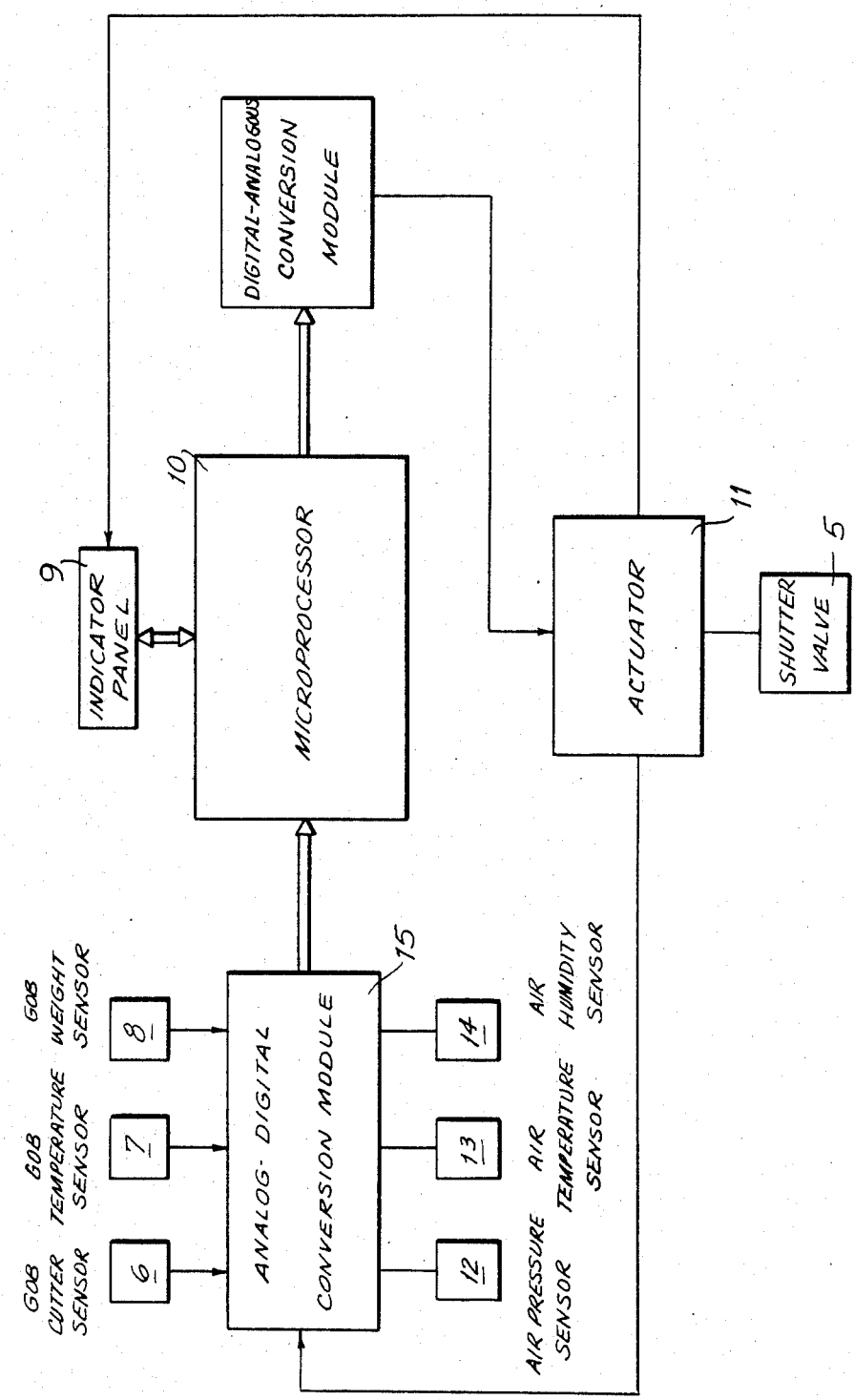
FIG. 2 is a block diagram of the electronic mold cooling system.

With reference to FIG. 2, gob cutting sensor 6, gob temperature sensor 7 and gob weight sensor 8 continuously send a signal representing the velocity of the machine, the thermal profile of the glass gob and its weight to the microprocessor 10 through an analog-digital conversion module 15. In the same way, air pressure sensor 12, air temperature sensor 13 and air humidity sensor 14 each 2 hours send a signal representative of the pressure, temperature and humidity of the cooling air in the duct, through said analog-digital conversion module, so that microprocessor 10, through its programs, carry out the necessary adjustments and controls the entire cooling process by the actuation of the shutter valve 5 and/or alternatively controlling the speed of the fan, through a digital signal converted to analogous signal by a digital to analogous conversion module, fed to actuator 11 for operate the shutter valve 5.

As previously stated, indicator panel 9 may include displays in order to check the values of the variables fed to microprocessor 10 and keyboards for feeding data needed by microprocessor 10.

The components of this electronic system can be selected from any known type.

Finally, it should be understood that the invention is not limited exclusively to the design of the embodiment disclosed but experts in the field will be enabled by the teaching of this invention to make changes in the design and distribution of its constitutent parts, while still being clearly within the true spirit and scope of the invention set forth in the following claims.

I claim:

1. In a glassware forming machine of the type including multiple sections each having multiple molds for receiving and processing glass gobs to produce glassware articles and having a mold cooling system which essentially comprises a source of cooling air, a manifold for said cooling air, a plurality of nozzles directing the cooling air to said molds, and flow control means for varying the flow rate of the cooling air through the manifold, the method for controlling the cooling of said molds, comprising:
    sensing, through first sensor means, the velocity of operation of the forming machine to derive signals representative thereof;
    sensing, through second sensor means, the temperature and weight of the glass gobs fed to the molds of the machine, to derive signals representative thereof;
    sensing, through third sensor means, the temperature, humidity and pressure of the cooling air in the manifold of the machine, to derive signals representative thereof;
    supplying said signals provided by the first, second and third sensor means to a microprocessor operative to provide a first table for processing the signals of the first and second sensor means in order to determine the actual thermal excitation of the molds and to derive command signals to control the flow rate of cooling air, and operative to provide a second table for processing the signals of the third sensor means in order to determine the physical conditions of the cooling air, and operative to provide a third table for recording the history of the operation conditions detected by all the sensor means and forecast, through said history, the changes of weather conditions, with up-dating and self-correction of the initial values and command signals;
    feeding the command signals derived by the microprocessor from said first and second tables to control means for controlling the rate of cooling air in accordance with the actual cooling needs of the molds; and,
    in the event of loss of any one of said first, second and third signals, substituting for the lost signal a signal derived from said historical memory of said third table.

* * * * *